US012682886B1

(12) United States Patent
Zhong et al.

(10) Patent No.: US 12,682,886 B1
(45) Date of Patent: Jul. 14, 2026

(54) ONE STAGE TEXT-TO-SPEECH SYSTEM WITH PROSODY CONTROL

(71) Applicant: Electronic Arts Inc., Redwood City, CA (US)

(72) Inventors: Ping Zhong, Mountain View, CA (US); Shahab Raji, Foster City, CA (US); Harold Henry Chaput, Castro Valley, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 547 days.

(21) Appl. No.: 18/128,976

(22) Filed: Mar. 30, 2023

(51) Int. Cl.
| | |
|---|---|
| *G10L 13/10* | (2013.01) |
| *A63F 13/60* | (2014.01) |
| *G10L 13/033* | (2013.01) |
| *G10L 13/047* | (2013.01) |

(52) U.S. Cl.
CPC .............. *G10L 13/10* (2013.01); *A63F 13/60* (2014.09); *G10L 13/0335* (2013.01); *G10L 13/047* (2013.01); *G10L 2013/105* (2013.01)

(58) Field of Classification Search
CPC ... G10L 13/10; G10L 13/0335; G10L 13/047; G10L 2013/105; A63F 13/60
See application file for complete search history.

(56) References Cited

U.S. PATENT DOCUMENTS

| | | | |
|---|---|---|---|
| 11,232,780 B1 * | 1/2022 | Iyer ....................... | G10L 13/027 |
| 11,295,721 B2 | 4/2022 | Gururani et al. | |
| 11,830,476 B1 * | 11/2023 | Karanasou .......... | G06N 3/0455 |

| | | | |
|---|---|---|---|
| 2019/0172443 A1 * | 6/2019 | Shechtman ........... | G10L 13/047 |
| 2021/0035551 A1 * | 2/2021 | Stanton .................. | G10L 13/033 |
| 2021/0074261 A1 * | 3/2021 | Yang ..................... | G10L 13/033 |
| 2021/0151029 A1 * | 5/2021 | Gururani .............. | G06N 3/0455 |
| 2021/0225358 A1 * | 7/2021 | Monge Alvarez .... | G10L 15/187 |
| 2022/0028367 A1 * | 1/2022 | Shekhar ................ | G10L 13/047 |
| 2022/0051654 A1 * | 2/2022 | Finkelstein ........... | G10L 13/047 |
| 2022/0059071 A1 * | 2/2022 | Pearce ................ | H04N 21/4788 |
| 2023/0099732 A1 * | 3/2023 | Mukherjee ........... | G06N 3/0442 704/258 |
| 2024/0087558 A1 * | 3/2024 | Oplustil Gallegos ....................... G10L 13/033 | |

OTHER PUBLICATIONS

Tan et al., "NaturalSpeech: End-to-End Text to Speech Synthesis with Human-Level Quality" arXiv:2205.04421v2 [eess.AS], 19 pages, dated May 10, 2022.
Kim et al., "Conditional Variational Autoencoder with Adversarial Learning for End-to-End Text-to-Speech" arXiv:2106.06103v1 [cs. SD], 15 pages, dated Jun. 11, 2021.

* cited by examiner

*Primary Examiner* — Richemond Dorvil
*Assistant Examiner* — Zeeshan Mahmood Shaikh
(74) *Attorney, Agent, or Firm* — Gray Ice Higdon

(57) ABSTRACT

This specification describes a computer-implemented method of generating expressive speech audio for use in a video game. The method comprises receiving user-input text data and receiving prosody data obtained from user-input speech style data. The user-input text data is processed by a text encoder to generate a text feature embedding. A speech feature embedding is generated by an embedding converter based upon the text feature embedding. The prosody data is processing by a prosody encoder to generate a prosody feature embedding. A speech signal is generated by a speech decoder based upon the speech feature embedding and the prosody feature embedding.

20 Claims, 6 Drawing Sheets

100

VIDEO GAME DEVELOPMENT SYSTEM
101

SPEECH AUDIO GENERATION SYSTEM    102

| TEXT ENCODER |
103

| EMBEDDING CONVERTER |
104

| PROSODY ENCODER |
105

| SPEECH DECODER |
106

| DURATION PREDICTOR |
107

TRAINING SYSTEM    108

| SPEECH ENCODER |
109

| TRAINING DATA |
110

| MODEL TRAINER |
111

| PROSODY ANALYZER |
112

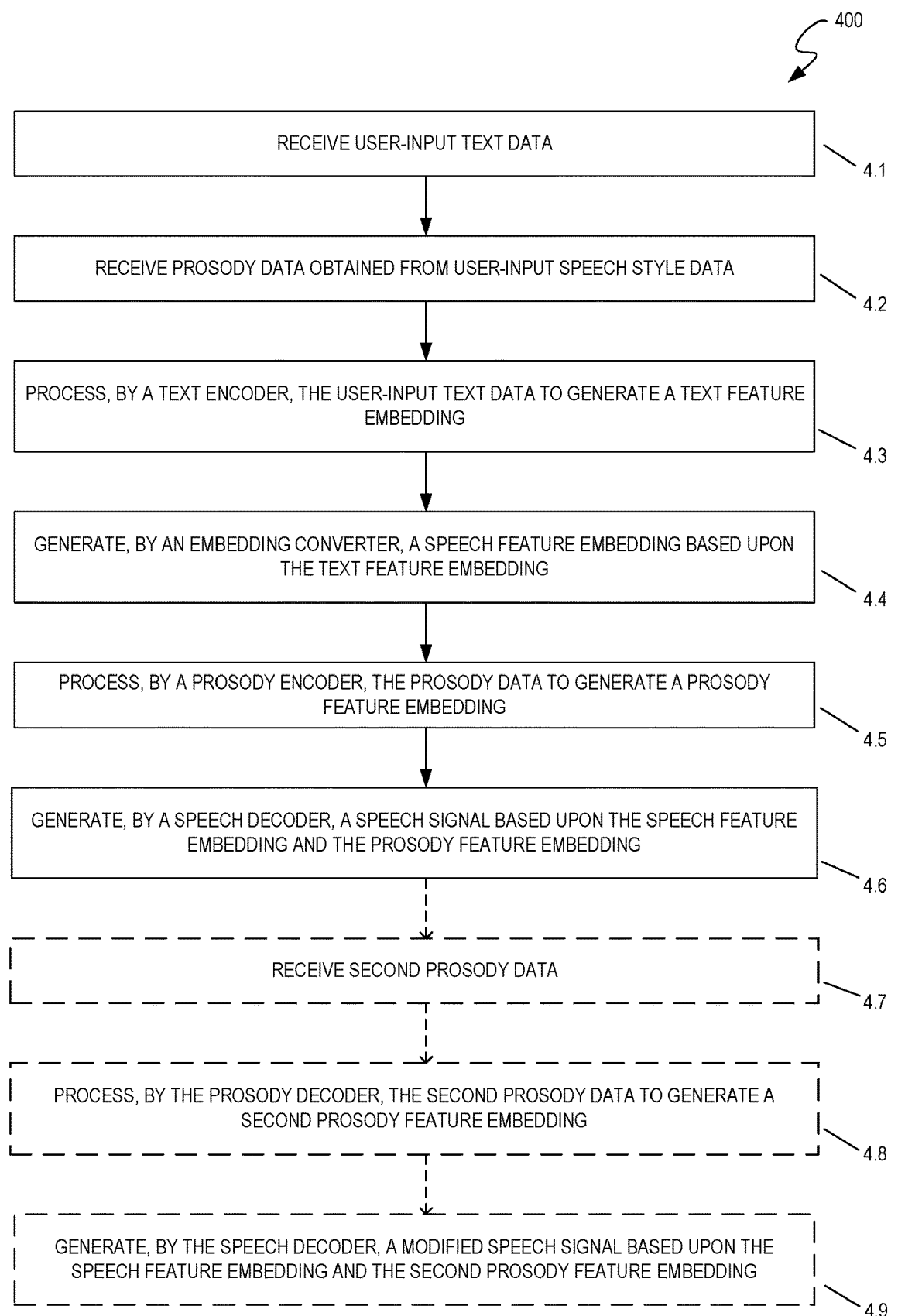

RECEIVE USER-INPUT TEXT DATA ⟍ 4.1

RECEIVE PROSODY DATA OBTAINED FROM USER-INPUT SPEECH STYLE DATA ⟍ 4.2

PROCESS, BY A TEXT ENCODER, THE USER-INPUT TEXT DATA TO GENERATE A TEXT FEATURE EMBEDDING ⟍ 4.3

GENERATE, BY AN EMBEDDING CONVERTER, A SPEECH FEATURE EMBEDDING BASED UPON THE TEXT FEATURE EMBEDDING ⟍ 4.4

PROCESS, BY A PROSODY ENCODER, THE PROSODY DATA TO GENERATE A PROSODY FEATURE EMBEDDING ⟍ 4.5

GENERATE, BY A SPEECH DECODER, A SPEECH SIGNAL BASED UPON THE SPEECH FEATURE EMBEDDING AND THE PROSODY FEATURE EMBEDDING ⟍ 4.6

RECEIVE SECOND PROSODY DATA ⟍ 4.7

PROCESS, BY THE PROSODY DECODER, THE SECOND PROSODY DATA TO GENERATE A SECOND PROSODY FEATURE EMBEDDING ⟍ 4.8

GENERATE, BY THE SPEECH DECODER, A MODIFIED SPEECH SIGNAL BASED UPON THE SPEECH FEATURE EMBEDDING AND THE SECOND PROSODY FEATURE EMBEDDING ⟍ 4.9

FIGURE 4

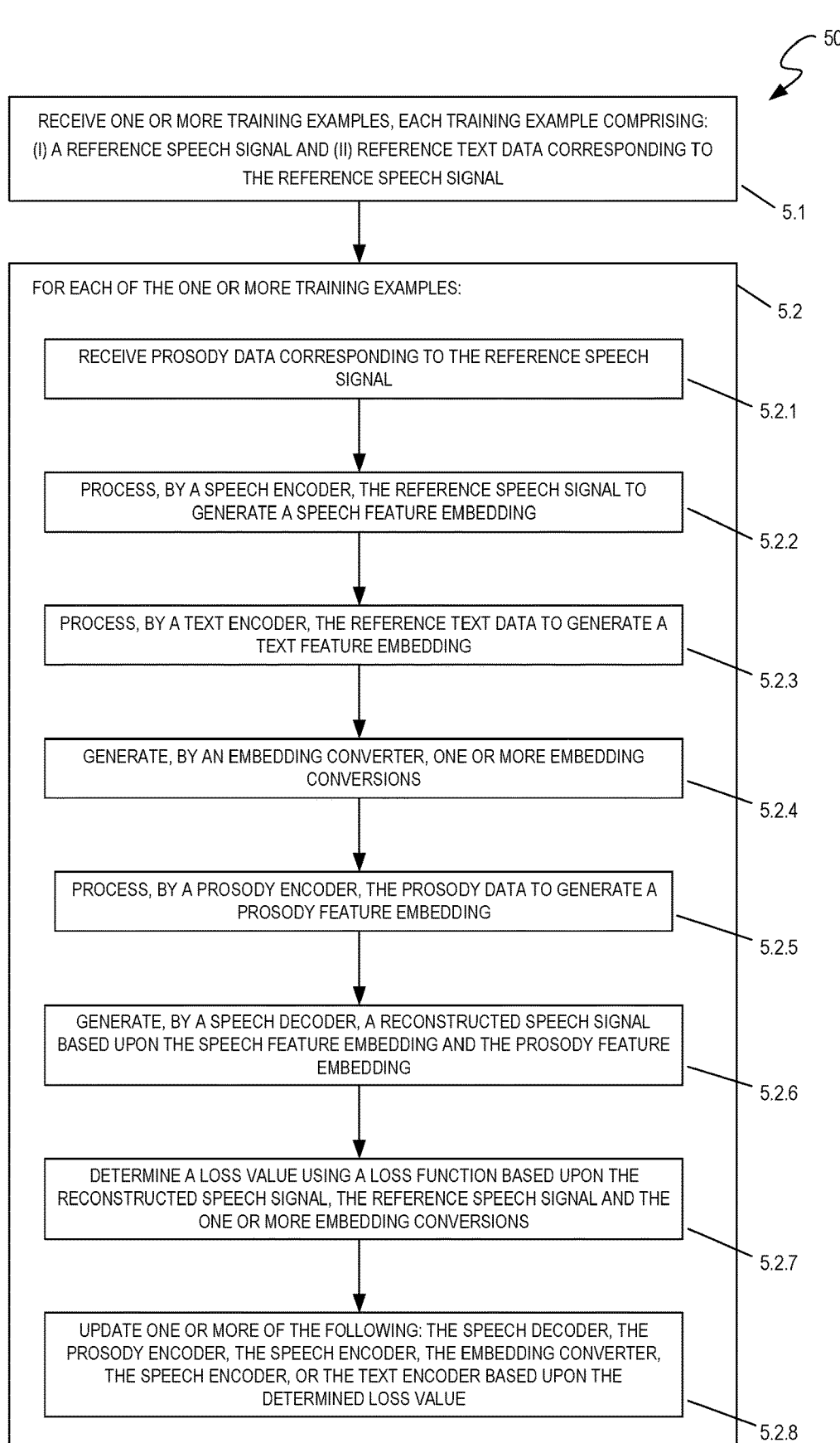

500

RECEIVE ONE OR MORE TRAINING EXAMPLES, EACH TRAINING EXAMPLE COMPRISING: (I) A REFERENCE SPEECH SIGNAL AND (II) REFERENCE TEXT DATA CORRESPONDING TO THE REFERENCE SPEECH SIGNAL 5.1

FOR EACH OF THE ONE OR MORE TRAINING EXAMPLES:

5.2

RECEIVE PROSODY DATA CORRESPONDING TO THE REFERENCE SPEECH SIGNAL 5.2.1

PROCESS, BY A SPEECH ENCODER, THE REFERENCE SPEECH SIGNAL TO GENERATE A SPEECH FEATURE EMBEDDING 5.2.2

PROCESS, BY A TEXT ENCODER, THE REFERENCE TEXT DATA TO GENERATE A TEXT FEATURE EMBEDDING 5.2.3

GENERATE, BY AN EMBEDDING CONVERTER, ONE OR MORE EMBEDDING CONVERSIONS 5.2.4

PROCESS, BY A PROSODY ENCODER, THE PROSODY DATA TO GENERATE A PROSODY FEATURE EMBEDDING 5.2.5

GENERATE, BY A SPEECH DECODER, A RECONSTRUCTED SPEECH SIGNAL BASED UPON THE SPEECH FEATURE EMBEDDING AND THE PROSODY FEATURE EMBEDDING 5.2.6

DETERMINE A LOSS VALUE USING A LOSS FUNCTION BASED UPON THE RECONSTRUCTED SPEECH SIGNAL, THE REFERENCE SPEECH SIGNAL AND THE ONE OR MORE EMBEDDING CONVERSIONS 5.2.7

UPDATE ONE OR MORE OF THE FOLLOWING: THE SPEECH DECODER, THE PROSODY ENCODER, THE SPEECH ENCODER, THE EMBEDDING CONVERTER, THE SPEECH ENCODER, OR THE TEXT ENCODER BASED UPON THE DETERMINED LOSS VALUE 5.2.8

FIGURE 5

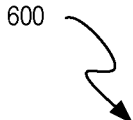
600
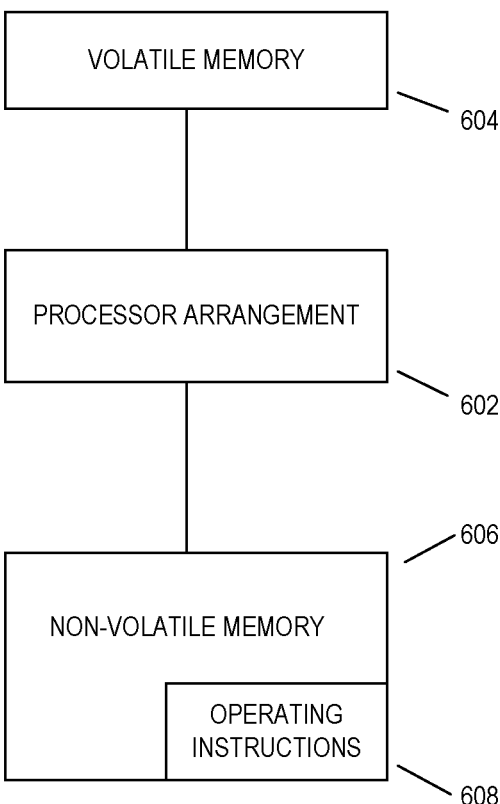
VOLATILE MEMORY
604
PROCESSOR ARRANGEMENT
602
606
NON-VOLATILE MEMORY
OPERATING
INSTRUCTIONS
608
FIGURE 6

ONE STAGE TEXT-TO-SPEECH SYSTEM WITH PROSODY CONTROL

BACKGROUND

Video games may include hundreds or thousands of background characters. Having lifelike and expressive speech for background characters can make the playing experience more immersive. In some cases, a speech audio generation system is used to generate speech in video game development. Improved text-to-speech systems have recently been proposed. However, these more recent systems lack prosody control and are therefore unsuitable for use in video game development.

SUMMARY

In accordance with a first aspect, this specification describes a computer-implemented method of generating expressive speech audio for use in a video game. The method comprises receiving user-input text data and receiving prosody data obtained from user-input speech style data. The user-input text data is processed by a text encoder to generate a text feature embedding. A speech feature embedding is generated by an embedding converter based upon the text feature embedding. The prosody data is processing by a prosody encoder to generate a prosody feature embedding. A speech signal is generated by a speech decoder based upon the speech feature embedding and the prosody feature embedding.

In accordance with another aspect, this specification describes a computing system for generating expressive speech audio for use in a video game. The system is configured to receive user-input text data and receive prosody data obtained from user-input speech style data. The system is further configured to process, by a text encoder, the user-input text data to generate a text feature embedding; and generate, by an embedding converter, a speech feature embedding based upon the text feature embedding. The system is further configured to process, by a prosody encoder, the prosody data to generate a prosody feature embedding; and generate, by a speech decoder, a speech signal based upon the speech feature embedding and the prosody feature embedding.

In accordance with a further aspect, this specification describes a non-transitory computer-readable medium storing instructions which when executed by a processor, cause the processor to receive user-input text data and receive prosody data obtained from user-input speech style data. The instructions further cause the processor to process, by a text encoder, the user-input text data to generate a text feature embedding; and generate, by an embedding converter, a speech feature embedding based upon the text feature embedding. The instructions further cause the processor to process, by a prosody encoder, the prosody data to generate a prosody feature embedding; and generate, by a speech decoder, a speech signal based upon the speech feature embedding and the prosody feature embedding.

In accordance with another aspect, this specification describes a computer-implemented method of training a machine-learned expressive speech audio generation system for use in a video game, the method comprising: receiving one or more training examples, each training example comprising: (i) a reference speech signal and (ii) reference text data corresponding to the reference speech signal. The method further comprises, for each of the one or more training examples: receiving prosody data corresponding to the reference speech signal. The reference speech signal is processed by a speech encoder to generate a speech feature embedding. The reference text data is processed by a text encoder to generate a text feature embedding. One or more embedding conversions are generated by an embedding converter. The generation comprises: processing, by the embedding converter, the speech feature embedding to generate a speech converted text feature embedding; and/or processing, by the embedding converter, the text feature embedding to generate a text converted speech feature embedding. The one or more embedding conversions comprises the speech converted text feature embedding and/or the text converted speech feature embedding. The prosody data is processed by a prosody encoder to generate a prosody feature embedding. A reconstructed speech signal is generated by a speech decoder based upon the speech feature embedding and the prosody feature embedding. A loss value is determined using a loss function based upon the reconstructed speech signal, the reference speech signal and the one or more embedding conversions. One or more of the following are updated: the speech decoder, the prosody encoder, the speech encoder, the embedding converter, the speech encoder, or the text encoder based upon the determined loss value.

In accordance with a further aspect, this specification describes a computer system for training a machine-learned expressive speech audio generation system for use in a video game. The system is configured to receive one or more training examples, each training example comprising: (i) a reference speech signal and (ii) reference text data corresponding to the reference speech signal. The system is further configured to, for each of the one or more training examples, receive prosody data corresponding to the reference speech signal. The system is further configured to process, by a speech encoder, the reference speech signal to generate a speech feature embedding; and process, by a text encoder, the reference text data to generate a text feature embedding. The system is further configured to generate, by an embedding converter, one or more embedding conversions. The generation comprises: processing, by the embedding converter, the speech feature embedding to generate a speech converted text feature embedding; and/or processing, by the embedding converter, the text feature embedding to generate a text converted speech feature embedding. The one or more embedding conversions comprises the speech converted text feature embedding and/or the text converted speech feature embedding. The system is further configured to process, by a prosody encoder, the prosody data to generate a prosody feature embedding; and generate, by a speech decoder, a reconstructed speech signal based upon the speech feature embedding and the prosody feature embedding. The system is further configured to determine a loss value using a loss function based upon the reconstructed speech signal, the reference speech signal and the one or more embedding conversions; and update one or more of the following: the speech decoder, the prosody encoder, the speech encoder, the embedding converter, the speech encoder, or the text encoder based upon the determined loss value.

In accordance with another aspect, this specification describes a non-transitory computer-readable medium storing instructions, which when executed by a processor, cause the processor to receive one or more training examples, each training example comprising: (i) a reference speech signal and (ii) reference text data corresponding to the reference speech signal. The instructions further cause the processor to, for each of the one or more training examples, receive prosody data corresponding to the reference speech signal. The instructions further cause the processor to process, by a speech encoder, the reference speech signal to generate a speech feature embedding; and process, by a text encoder, the reference text data to generate a text feature embedding. The instructions further cause the processor to generate, by an embedding converter, one or more embedding conversions. The generation comprises: processing, by the embedding converter, the speech feature embedding to generate a speech converted text feature embedding; and/or processing, by the embedding converter, the text feature embedding to generate a text converted speech feature embedding. The one or more embedding conversions comprises the speech converted text feature embedding and/or the text converted speech feature embedding. The instructions further cause the processor to process, by a prosody encoder, the prosody data to generate a prosody feature embedding; and generate, by a speech decoder, a reconstructed speech signal based upon the speech feature embedding and the prosody feature embedding. The instructions further cause the processor to determine a loss value using a loss function based upon the reconstructed speech signal, the reference speech signal and the one or more embedding conversions; and update one or more of the following: the speech decoder, the prosody encoder, the speech encoder, the embedding converter, the speech encoder, or the text encoder based upon the determined loss value.

BRIEF DESCRIPTION OF THE DRAWINGS

FIG. 4 is a flow diagram illustrating an example method of generating expressive speech audio.

FIG. 5 is a flow diagram illustrating an example method of training a speech audio generation system.

FIG. 6 shows a schematic example of a system/apparatus for performing any of the methods described herein.

DETAILED DESCRIPTION

General Definitions

Figure 1:
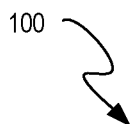
FIG. 1 is a schematic block diagram illustrating an example of a computer system for generating expressive speech audio and training of the system.

The following terms are defined to aid the present disclosure and not limit the scope thereof.

A "user" or "player", as used in some embodiments herein, refers to an individual and/or the computing system (s) or device(s) corresponding to (e.g., associated with, operated by) that individual.

A "video game" as used in some embodiments described herein, is a virtual interactive environment in which players engage.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Text" as used in some in embodiments described herein refers to any suitable representation of characters, words or symbols that may be used to represent language and/or speech. As noted above, this may include all types of utterances such as paralinguistics. In some cases, text data may be input by use of a keyboard or obtained from a selection on a user interface using other input devices such as a mouse or touch screen. The text data may be stored in memory in any suitable compressed or uncompressed format, e.g. ASCII format.

"Prosody" as used in some embodiments described herein refers to the way in which speech is expressed, e.g. the intonation, pitch, volume, timing (e.g. rhythm, speech rate) and/or tone of speech. It may include pronunciation aspects such as articulation or stress and/or performance aspects such as intensity/arousal or valence. In some embodiments described herein prosody may be represented by prosodic features which may be derived from pitch and/or volume contours, timing information, etc, and may be predicted using the models described herein A "speech audio generation system" as used in some embodiments described herein, is a system that receives an indication of an utterance (e.g. text data) and outputs speech audio corresponding to the indication. Various characteristics of the output speech audio may be varied by speech audio generation system modules described herein, e.g. speech content, speaker identity, and speech expression.

"Acoustic features" as used in some embodiments described herein may include any suitable acoustic representation of frequency, magnitude and/or phase information of speech audio. For example, acoustic features may comprise linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof.

"Speech signal" as used in some embodiments described herein may include any suitable representation or encoding of a waveform and in particular may comprise a time-domain waveform, e.g. in digital form. The encoding may be compressed or uncompressed and have any suitable sampling rate and bit-depth.

Speech audio for use in video games can be generated in a number of ways, including by humans, machines or a combination of both, as deemed appropriate or optimal based on various factors known to those of skill in the art. The example implementations described herein provide systems and methods for generating expressive speech audio and training of such systems for use in a video game. In many video games, it is desirable for the expression of speech audio to be appropriate for the context of the video game for which the speech audio is output. Example systems and methods described in this specification provide one means through which users can generate speech audio for video games with fine-grained control in the expression of the generated speech audio. Thus, speech audio generated using the systems and methods described herein can express a wide-varying range of expressions.

The systems and methods described in this specification enable the training of a speech audio generation system that receives user-input text data, receives prosody data from user-input speech style data, and generates a speech signal with a spoken representation of the user-input text data and spoken in a manner specified by the prosody data. The generated speech audio may be stored for use in a video game application.

The described systems and methods provide a one-stage text-to-speech audio generation system. That is, the components of the system are jointly trained, end-to-end. Conventional two-stage text-to-speech audio generation systems typically comprise a first stage, e.g. a synthesizer, that generates an intermediate representation, such as acoustic features, and a second stage, e.g. a vocoder, that generates speech audio from the intermediate representation. In contrast, the decoder of the one-stage text-to-speech system described in this specification generates the speech signal directly rather than generating an intermediate representation which is subsequently transformed into a speech signal by a downstream component such as a vocoder. Since a one-stage text-to-speech system may be jointly trained in an end-to-end fashion, there may be a reduction in the computational resources required for training the one-stage system as compared to a two-stage system.

The one-stage text-to-speech audio generation system described herein comprises an embedding converter which is configured to convert a text feature embedding to a speech feature embedding from which a speech decoder generates a speech signal as an output of the speech decoder. The embedding converter is trained to convert to/from speech feature embeddings and text feature embeddings generated from corresponding reference speech signals and text data. After training, the embedding converter enables generation of a speech feature embedding for generating speech audio using the text data without the need for any reference speech data.

The described one-stage text-to-speech audio generation system makes further use of a prosody encoder to generate a prosody feature embedding from received prosody data. The prosody feature embedding is provided as an additional input to the speech decoder to enable generation of a speech signal having the desired speaking style. The speaking style of the generated speech signal can be modified by simply providing new input prosody data to the prosody encoder and speech decoder. The system does not require re-training or fine-tuning to generate speech signals with different prosody. In this way, prosody control is provided within a one-stage text-to-speech audio generation system.

Furthermore, even with the inclusion of prosody control in a one-stage text-to-speech audio generation system, the system can still be trained using existing training frameworks such as a variational auto-encoder framework without necessarily requiring any prosody specific modification of the loss functions used in the framework.

FIG. 1 is a schematic block diagram illustrating an example of a computer system 100 for generating expressive speech audio as part of a video game development system 101. The video game development system 101 comprises a speech audio generation system 102 and a training system 108 for training the speech audio generation system 102. The speech audio generation system 102 is used or otherwise accessed by users when generating speech audio during a video game development process.

The speech audio generation system 102 comprises a text encoder 103, an embedding converter 104, a prosody encoder 105 and a speech decoder 106. The speech audio generation system 102 may further comprise a duration predictor 107. These components of the speech audio generation system 102 may comprise one or more machine learning models.

The text encoder 103 is configured to process received user-input text data to generate a text feature embedding. The received text data is indicative of the desired content of the speech audio to be generated. For example, the text data may comprise data indicative of words to be spoken and/or any paralinguistic utterances such as sighs, yawns, moans, laughs, grunts, etc. The text data may be encoded by a sequence of vectors with each vector representing a word, character, phoneme or any other sub-word unit or paralinguistic utterance. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings.

The text encoder 103 transforms the input text data to a text feature embedding. The text feature embedding may comprise one or more vectors in a learned embedding space. The embedding space may disentangle aspects of the input text data and may provide a representation or encoding of the input text data that is more amenable for the subsequent processing to generate speech audio. The text encoder 103 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

The embedding converter 104 is configured to process the text feature embedding to generate a speech feature embedding. As described in more detail below, the embedding converter 104 is trained with the aim of generating a speech feature embedding that would have been generated by a speech encoder from a speech signal corresponding to the user-input text data. The speech feature embedding may comprise one or more vectors in a learned embedding space that disentangles aspects of a speech signal and the embedding converter 104 provides a conversion from the learned text embedding space to the learned speech embedding space in order for speech audio corresponding to the user-input text data to be generated. The embedding converter 104 may be bi-directional and may also be configured to generate a text feature embedding from a speech feature embedding. The embedding converter 104 may comprise a non-linear invertible transform such as a flow model and may be implemented using one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

The prosody encoder 105 is configured to process received prosody data to generate a prosody feature embedding. The prosody data is obtained from user-input speech style data. The speech style data may comprise data indicative of a particular speech expression. For example, the data may indicate a speech expression as natural language, e.g. "Surprised", "In disbelief", "Accusingly", etc. In some cases, the speech expression data may implicitly indicate a speech expression, for example by indicating a particular context of the video game such as "Running away from demons". In some implementations, the prosody data may be the speech style data itself.

The prosody data may relate to (or represent) the volume and/or pitch of the desired speech audio. The prosody data may comprise prosodic statistical features. For example, the prosody data may comprise one or more statistical features of a pitch contour and/or a volume contour for the generated speech signal. The one or more statistical features may comprise: a mean, a variance, a maximum and a minimum of a pitch contour for the speech audio; and/or a mean, a variance, and a maximum of a volume contour for the speech audio. Statistical features provide a low-dimensional representation of a desired speech style and can allow for more control of various speech style attributes when generating expressive speech audio. Processing statistical features may use fewer computational resources and/or be processed faster than high dimensional features, such as spectrogram data. Statistical features may also require less storage space than other types of speech style features. In implementations where the speech style features are transmitted via a network, transmitting statistical features may also use fewer network resources and consume less network bandwidth. In some implementations, a user may directly provide prosody data as the user-input speech style data.

The prosody encoder 105 generates a prosody feature embedding from the prosody data. The prosody feature embedding is a representation or encoding of the prosody data in a learned prosody embedding space. The prosody feature embedding may comprise one or more vectors in the learned embedding space. The prosody encoder 105 may be comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

The speech decoder 106 is configured to process the speech feature embedding generated by the embedding converter 104 and the prosody feature embedding generated by the prosody encoder 105. The processing by the speech decoder 106 generates a speech signal having the desired content according to the user-input text data with the desired speaking style according to the prosody data. In other words, the speech decoder 106 decodes the speech feature embedding and prosody feature embedding to generate a corresponding expressive speech signal. The speech signal may be a waveform encoded in any suitable digital audio format.

The prosody of the generated speech signal may be adjusted by a user simply by providing a different speaking style input to the system. New prosody data may be generated or the existing prosody data may be modified based upon the input different speaking style. The prosody encoder 105 may process the prosody data to generate a prosody feature embedding corresponding to the different speaking style. The speech decoder 106 processes the new prosody feature embedding and the speech feature embedding to generate a speech signal having the different speaking style but with the same linguistic/para-linguistic content corresponding to the user-input text data.

The speech feature embedding and the prosody feature embedding may be combined and provided as input to the speech decoder 106. The speech decoder 106 may be configured to process the combined embedding to generate the speech signal. The combining operation may comprise any operation resulting in a single embedding. For example, the combination may be performed by a concatenation, an addition, an averaging, a dot product, or a Hadamard product. The speech feature embedding and the prosody feature embedding may be vectors having dimensions adapted for combination. For example, in some embodiments the embedding converter 104 and the prosody encoder 105 may generate vector outputs of the same dimension, which may be combined by a suitable operation such as addition.

The speech decoder 106 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

In some implementations, the speech audio generation system 102 may comprise a duration predictor 107. The duration predictor 107 is configured to process the text feature embedding to generate a predicted spoken duration for the user-specified text data. For example, the duration predictor 107 may determine a number of audio frames that a particular element of the user-input text data should last for. The predicted spoken duration may be used to modify the text feature embedding to reflect the predicted duration of each element of the user-input text data. The embedding converter 104 may be configured to process the duration modified text feature embedding to generate the speech feature embedding.

The duration predictor 107 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

The training system 108 is used or otherwise accessed when training the speech audio generation system 102. The training system 108 comprises a speech encoder 109, training data 110 comprising a plurality of training examples, and a model trainer 111. The training system 108 may further comprise a prosody analyzer 112.

During training, model trainer 111 is configured to receive one or more training examples from training data 109, and to process the training examples to update parameters of the speech audio generation system 102. The parameters of the speech encoder 109 are also updated during trained by the model trainer 111 at the same time. After training however, the speech encoder 109 is not required in order to generate a speech signal due to the use of the embedder converter 104 to convert from the text embedding space to the speech embedding space.

Each training example comprises a reference speech signal and reference text data corresponding to the reference speech signal. The training example may further comprise prosody data corresponding to the reference speech signal. Alternatively, the prosody analyzer 112 may be configured to process the reference speech signal to generate prosody data corresponding to the reference speech signal. The prosody analyzer 112 may determine prosodic statistical features by analyzing the reference speech signal and computing the appropriate statistics of the signal. Alternatively, or in addition, the prosody analyzer 112 may comprise a machine-learned model that has previously been trained to extract prosodic features. In this regard, the machine-learned model may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

During training, the prosody encoder 105 of the speech audio generation system 102 is configured to generate a prosody feature embedding from the prosody data corresponding to the reference speech signal.

The speech encoder 109 is configured to process the reference speech signal to generate a speech feature embedding. The speech encoder 109 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

During training, the speech decoder 106 of the speech audio generation system 102 is configured to process the speech feature embedding and the prosody feature embedding to generate a reconstruction of the reference speech signal. The model trainer 111 is configured to use the reconstructed speech signal as part of a loss function for training the speech audio generation system 102. For example, the loss function may comprise a reconstruction loss term based upon a measure of difference between the reconstructed speech signal and the reference speech signal. The measure of difference may be any appropriate measure such as an L1-norm (absolute difference) or L2-norm (Euclidean distance). The measure of difference may compare the waveforms of the reconstructed and reference speech signals directly or the measure of difference may compare a representation derived from the two speech signals such as a linear or mel-spectrogram.

During training, the text encoder 103 is configured to process the reference text data to generate a text feature embedding. The embedding converter 104 is configured to perform one or more embedding conversions. That is, the embedding converter 104 may be configured to process the text feature embedding generated from the reference text data to generate a (text converted) speech feature embedding. Additionally or alternatively, the embedding converter 104 may be configured to process the speech feature embedding generated from the reference speech signal to generate a (speech converted) text feature embedding. The model trainer 111 is configured to use the one or more embedding conversions in a loss function for training speech audio generation system 102. For example, the loss function may comprise a conversion loss term based upon a Kullback-Liebler (KL) divergence computed using the one or more embedding conversions.

The model trainer 111 is configured to determine a loss value using the loss function based upon the reconstructed speech signal, the reference speech signal and the one or more embedding conversions. The model trainer 111 is configured to update one or more of the speech decoder 106, the prosody encoder 105, the speech encoder 109, the embedding converter 104, or the text encoder 103 based upon the determined loss value. As described in more detail below, the particular components that are to be updated may be dependent on the particular form of the loss function and which components contribute towards the determination of the loss value. The model trainer 111 may update the components based upon a gradient optimization technique such as stochastic gradient descent. In implementations where the speech audio generation system 102 comprises a duration predictor 107, the duration predictor 107 may be configured to operate during training in a similar manner discussed above for generating a speech signal from user input text-data. The model trainer 111 may also be configured to update the duration predictor 107 as appropriate. As discussed above, training is carried out in one-stage, that is the components of the system are trained jointly, end-to-end.

In some implementations, the speech audio generation system 102 and the speech encoder 109 may be based upon a variational auto-encoder framework. For example, the text encoder 103 may comprise a machine-learning model having parameters that represents a probability distribution conditioned on the user-input text data. The conditional probability distribution parameterized by the text encoder 103 may form a "prior encoder" of a variational auto-encoder. The text feature embedding may be generated by sampling from this conditional probability distribution. In implementations comprising a duration predictor 107, the text encoder 103 and the duration predictor 107 may together parameterize the conditional probability distribution.

Likewise, the speech encoder 109 may comprise a machine-learning model having parameters that represents a probability distribution conditioned on a speech signal. The conditional probability distribution parameterized by the speech encoder 109 may form a "posterior encoder" of a variational auto-encoder. A speech feature embedding (of the input speech signal) may be generated by sampling from this conditional probability distribution.

The speech decoder 106 may comprise a machine-learning model having parameters that represents a probability distribution conditioned on a speech feature embedding and a prosody feature embedding. The conditional probability distribution parameterized by the speech decoder 106 may form a "decoder" of a variational auto-encoder. The speech signal may be generated by sampling from this conditional probability distribution.

All of the above discussed conditional probability distributions may take any appropriate form. For example, the conditional probability distributions may be based upon a Gaussian distribution, in particular, with diagonal covariance.

Where a variational auto-encoder is implemented, the loss function may be based upon an evidence-based lower bound (ELBO). For example, the loss function may comprise a conversion loss term based upon the KL-divergence between the conditional probability distributions parameterised by the posterior encoder and the prior encoder.

Figure 2:
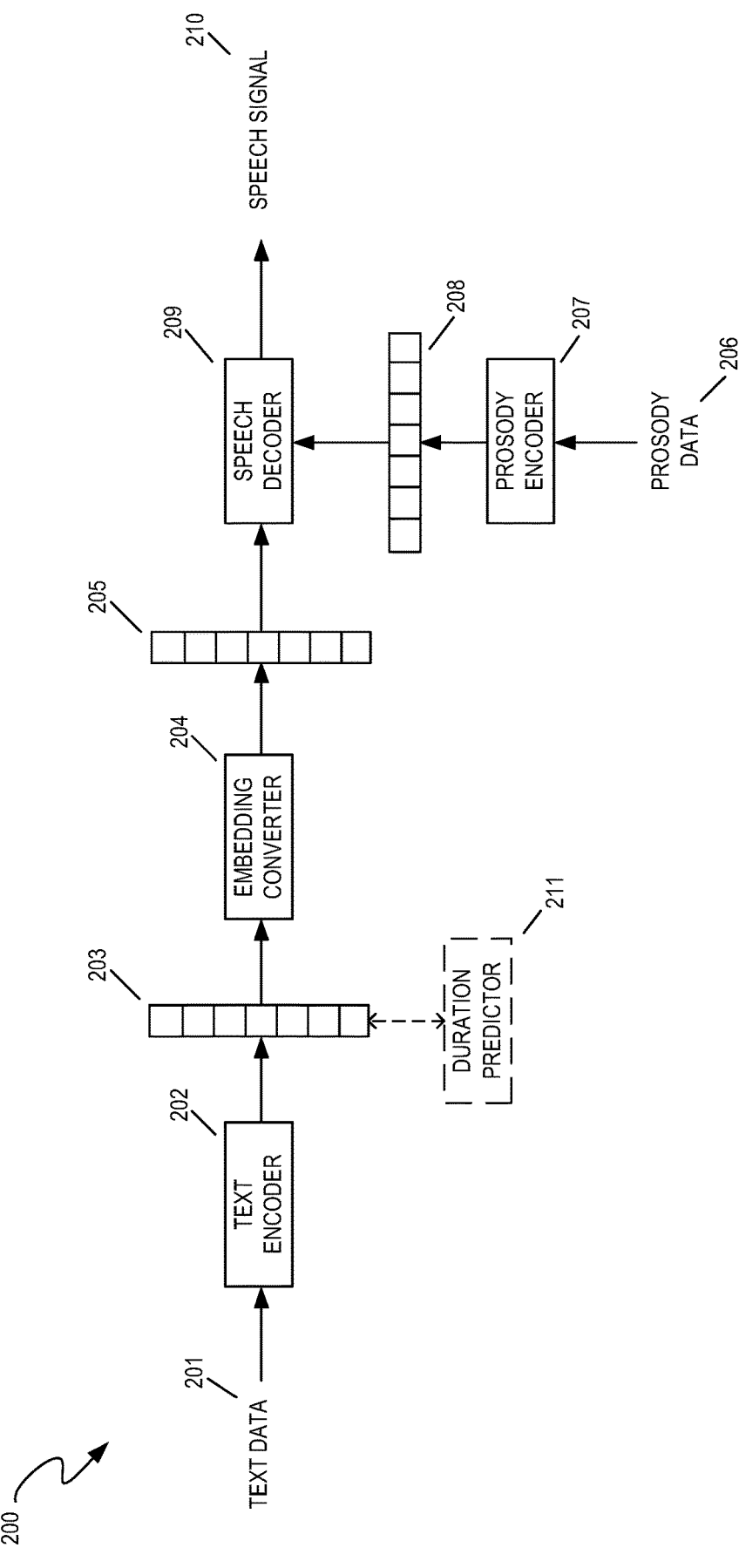
FIG. 2 illustrates an example method of generating speech audio.

FIG. 2 illustrates an example method 200 of generating expressive speech audio. The method 200 can be implemented using the system described above with reference to FIG. 1.

Text-data 201 is received and processed by a text encoder 202 to generate a text feature embedding 203. As discussed above, the received text data is indicative of the desired content of the speech audio to be generated. For example, the text data may comprise data indicative of words to be spoken and/or any paralinguistic utterances such as sighs, yawns, moans, laughs, grunts, etc. The text data may be encoded by a sequence of vectors with each vector representing a word, character, phoneme or any other sub-word unit or paralinguistic utterance. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings.

The text feature embedding 203 may comprise one or more vectors in a learned embedding space. The embedding space may disentangle aspects of the input text data 201 and may provide a representation or encoding of the input text data 201 that is more amenable for the subsequent processing to generate speech audio. The text encoder 202 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

As discussed above, the text encoder 202 may parameterize a conditional probability distribution. In such implementations, the text feature embedding 203 may be generated by sampling from this conditional probability distribution.

An embedding converter 204 processes the text feature embedding 203 to generate a speech feature embedding 205. The embedding converter 204 is trained with the aim of generating a speech feature embedding that would have been generated by a speech encoder from a speech signal corresponding to the user-input text data. The speech feature embedding may comprise one or more vectors in a learned embedding space that disentangles aspects of a speech signal and the embedding converter 204 provides a conversion from the learned text embedding space to the learned speech embedding space in order for speech audio corresponding to the user-input text data 201 to be generated. The embedding converter 204 may comprise a non-linear invertible transform such as a flow model and may be implemented using one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

Prosody data 206 is received and processed by a prosody encoder 207 to generate a prosody feature embedding 208. As discussed above, the prosody data is obtained from user-input speech style data. The speech style data may comprise data indicative of a particular speech expression.

For example, the data may indicate a speech expression as natural language, e.g. "Surprised", "In disbelief", "Accusingly", etc. In some cases, the speech expression data may implicitly indicate a speech expression, for example by indicating a particular context of the video game such as "Running away from demons". In some implementations, the prosody data may be the speech style data itself.

The prosody data may relate to (or represent) the volume and/or pitch of the desired speech audio. The prosody data may comprise prosodic statistical features. For example, the prosody data may comprise one or more statistical features of a pitch contour and/or a volume contour for the generated speech signal. The one or more statistical features may comprise: a mean, a variance, a maximum and a minimum of a pitch contour for the speech audio; and/or a mean, a variance, and a maximum of a volume contour for the speech audio. Statistical features provide a low-dimensional representation of a desired speech style and can allow for more control of various speech style attributes when generating expressive speech audio. Processing statistical features may use fewer computational resources and/or be processed faster than high dimensional features, such as spectrogram data. Statistical features may also require less storage space than other types of speech style features. In implementations where the speech style features are transmitted via a network, transmitting statistical features may also use fewer network resources and consume less network bandwidth. In some implementations, a user may directly provide prosody data as the user-input speech style data.

The prosody feature embedding 208 is a representation or encoding of the prosody data 206 in a learned prosody embedding space. The prosody feature embedding 208 may comprise one or more vectors in the learned embedding space. The prosody encoder 207 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

A speech decoder 209 processes the speech feature embedding 205 and the prosody feature embedding 208 to generate a speech signal 210. As discussed above, the processing by the speech decoder 209 generates a speech signal 210 having the desired content according to the user-input text data 201 with the desired speaking style according to the prosody data 206. In other words, the speech decoder 209 decodes the speech feature embedding 205 and prosody feature embedding 208 to generate a corresponding expressive speech signal 210. The speech signal 210 may be a waveform encoded in any suitable digital audio format.

The speech feature embedding 205 and the prosody feature embedding 208 may be combined to generate a combined embedding. In these implementations, the speech decoder 209 processes the combined embedding to generate the speech signal 210. The combining operation may comprise any operation resulting in a single encoding. For example, the combination may be performed by a concatenation, an addition, an averaging, a dot product, or a Hadamard product. The speech feature embedding 205 and the prosody feature embedding 208 may be vectors having dimensions adapted for combination. For example, in some embodiments the embedding converter 204 and the prosody encoder 207 may generate vector outputs of the same dimension, which may be combined by a suitable operation such as addition.

The speech decoder 209 may be comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

As discussed above, the speech decoder 209 may parameterize a conditional probability distribution. In such implementations, the speech signal 210 may be generated by sampling from this conditional probability distribution.

In some implementations, a duration predictor 211 processes the text feature embedding 203 to generate a predicted spoken duration for the user-specified text data 201. For example, the duration predictor 211 may determine a number of audio frames that a particular element of the user-input text data 201 should last for. The predicted spoken duration may be used to modify the text feature embedding 203 to reflect the predicted duration of each element of the user-input text data 201. The embedding converter 204 may process the duration modified text feature embedding 203 to generate the speech feature embedding 205.

The duration predictor 211 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

Figure 3:
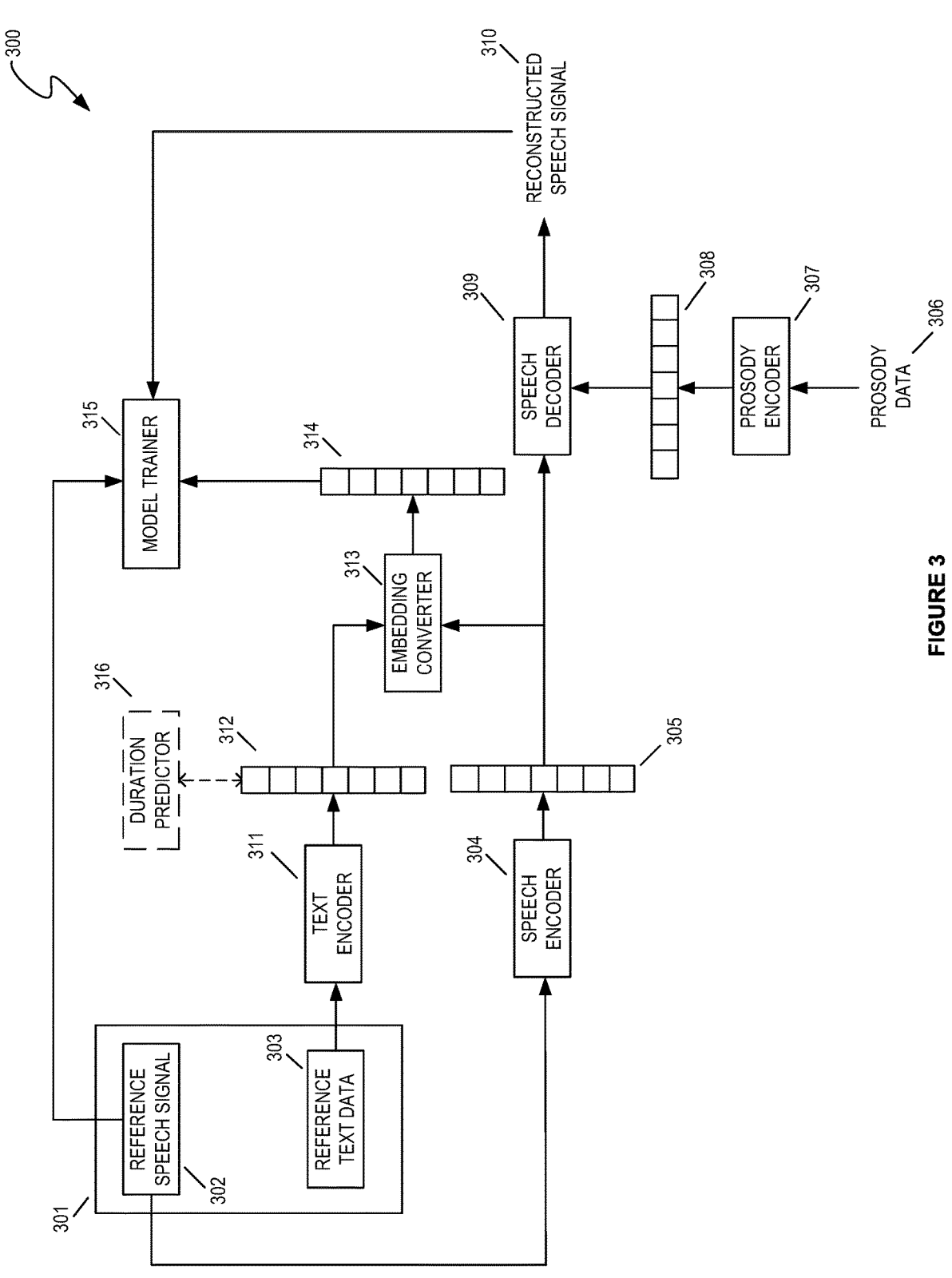
FIG. 3 illustrates an example method of training a speech audio generation system.

FIG. 3 illustrates an example method 300 of training a speech audio generation system. The method 300 can be implemented using the system described above with reference to FIG. 1.

A training example 301 comprising a reference speech signal 302 and corresponding reference text data 303 is received. The training example 301 may be part of a training data set and may be obtained from local storage or received over a network connection via any appropriate communications method.

A speech encoder 304 processes the reference speech signal 302 to generate a speech feature embedding 305. The speech feature embedding 305 may comprise one or more vectors in a learned embedding space that disentangles aspects of the reference speech signal 302. The speech encoder 304 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

As discussed above, the speech encoder 304 may parameterize a conditional probability distribution. In such implementations, the speech feature embedding 305 may be generated by sampling from this conditional probability distribution.

Prosody data 306 corresponding to the reference speech signal 302 is received and processed a prosody encoder 307 to generate a prosody feature embedding 308. The prosody data 306 may relate to (or represent) the volume and/or pitch of the reference speech signal 302. The prosody data 306 may comprise prosodic statistical features. For example, the prosody data 306 may comprise one or more statistical features of a pitch contour and/or a volume contour of the reference speech signal 302. The one or more statistical features may comprise: a mean, a variance, a maximum and a minimum of a pitch contour for the speech audio; and/or a mean, a variance, and a maximum of a volume contour for the speech audio.

The training example 301 may further comprise the prosody data 306 corresponding to the reference speech signal 302. Alternatively, a prosody analyzer may process the reference speech signal 302 to generate prosody data 306 corresponding to the reference speech signal 302. The prosody analyzer may determine prosodic statistical features by analyzing the reference speech signal 302 and computing the appropriate statistics of the signal. Alternatively, or in addition, the prosody analyzer may comprise a machine-learned model that has previously been trained to extract prosodic features. In this regard, the machine-learned model may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network layers may comprise layers configured based upon a Transformer block. For example, the neural network layers may implement an attention mechanism such as self-attention or cross-attention.

A speech decoder 309 processes the speech feature embedding 305 generated from the reference speech signal 302 and the prosody feature embedding 308 to generate a reconstructed speech signal 310. That is, the speech decoder 309 decodes the speech feature embedding 305 and the prosody feature embedding 308 to attempt to reconstruct the original reference speech signal 302. As described in more detail below, the reconstructed speech signal 310 and the reference speech signal 302 are used by a model trainer 315 as part of a loss function for the training method.

As discussed above, the speech decoder 309 may parameterize a conditional probability distribution. In such implementations, the reconstructed speech signal 310 may be generated by sampling from this conditional probability distribution.

A text encoder 311 processes the reference text data 303 of the training example 301 to generate a text feature embedding 312. As discussed above, the text encoder 311 may parameterize a conditional probability distribution. In such implementations, the text feature embedding 312 may be generated by sampling from this conditional probability distribution.

An embedding converter 313 generates one or more embedding conversions 314. The one or more embedding conversions 314 may comprise a speech converted text feature embedding generated by processing the speech feature embedding 305 using the embedding converter 313, and/or a text converted speech feature embedding generated by processing the text feature embedding 312 using the embedding converter 313. That is, the one or more embedding conversions 314 may comprise a single conversion in a single direction, i.e. from the speech feature embedding space to the text feature embedding space or from the text feature embedding space to the speech feature embedding space, or may comprise conversions in both directions. As described in more detail below, the model trainer 315 uses the one or more embedding conversions 314 as part of a loss function for the training method.

The model trainer 315 determines a loss value using a loss function based upon the reconstructed speech signal 310, the reference speech signal 302 and the one or more embedding conversions 314.

For example, the loss function may comprise a reconstruction loss term based upon a measure of difference between the reconstructed speech signal 310 and the reference speech signal 302. The measure of difference may be any appropriate measure such as an L1-norm (absolute difference) or L2-norm (Euclidean distance). The measure of difference may compare the waveforms of the reconstructed and reference speech signals directly or the measure of difference may compare a representation derived from the two speech signals such as a linear or mel-spectrogram.

In another example, the loss function may comprise a conversion loss term based upon a Kullback-Liebler (KL) divergence computed using the one or more embedding conversions. In implementations where a variational auto-encoder is implemented, the conversion loss term may be based upon the KL-divergence between the conditional probability distributions parameterised by the posterior encoder and the prior encoder. For example, where a speech feature embedding generated from a reference speech signal is converted to a text feature embedding, computing the KL-divergence may comprise computing the probability of the speech feature embedding under the conditional probability distribution parameterized by the speech encoder (posterior encoder), computing the probability of the speech converted text feature embedding under the conditional probability distribution parameterized by the text encoder (prior encoder), and comparing the computed probabilities.

Likewise, where a text feature embedding generated from reference text data is converted to a speech feature embedding, computing the KL-divergence may comprise computing the probability of the text feature embedding generated from the reference text data under the conditional probability distribution parameterized by the text encoder, computing the probability of the text converted speech feature embedding under the conditional probability distribution parameterized by the speech encoder, and comparing the computed probabilities. Where both types of conversions are used, the conversion loss term may comprise a combination of the individual KL-divergence values.

As an alternative to the KL-divergence, the conversion loss term may be based upon a measure of difference between the text converted speech feature embedding and the speech feature embedding generated from the reference speech signal and/or a measure of difference between the speech converted text feature embedding and the text feature embedding generated from the reference text data. The measure of difference may be any appropriate measure of difference such as an L1-norm (absolute distance) or L2-norm (Euclidean distance).

In some implementations, the loss function comprises a reconstruction loss term and a conversion loss term. Where a variational auto-encoder is implemented, the loss function may be based upon an evidence-based lower bound (ELBO).

The model trainer 315 updates one or more of the speech decoder 309, the prosody encoder 307, the embedding converter 313, the speech encoder 304 or the text encoder 311 based upon the determined loss value. The particular components that are to be updated may be dependent on the particular form of the loss function and which components contribute towards the determination of the loss value. For example, where the loss function comprises a reconstruction loss term based upon a measure of a difference between the reconstructed speech signal 310 and the reference speech signal 302, the components that contributed towards generating the reconstructed speech signal 310, i.e. the speech encoder 304, the prosody encoder 307 and the speech decoder 309 may be updated. Where the loss function comprises a conversion loss term, the text encoder 311, the speech encoder 304 and the embedding converter 313 may be updated.

The model trainer 315 may update the components based upon a gradient optimization technique such as stochastic gradient descent and may include include momentum-based methods such as Adam, RMSProp, and AdaGrad. An update may be based upon a single training example or may be based upon a batch of training examples. For example, in batch updating, a plurality of training examples may be processed to determine an update value for each individual training example of the batch. The actual update to the components may be based upon a combination of the individual update values such as an average over the individual update values.

The training method 300 may be repeated for further training examples/batches in the training data set and the training method may be performed over a plurality of passes over the training data set. The training may continue until a stopping criterion is reached. For example, where the loss function value reaches a particular threshold value or when a fixed number of training iterations have been performed.

In some implementations, the training method 300 may also utilize adversarial training. In general, adversarial training utilizes a discriminator machine learning model that is trained at the same time as the generative system. The purpose of the discriminator is to classify whether a particular input example was generated by the system or whether the particular input example is a reference example. Thus, in adversarial training, the system attempts to generate examples that are good enough to fool the discriminator whilst the discriminator is trained to detect the output of the system. With respect to the training method 300, the loss function may further comprise an adversarial loss term based upon an ability of a discriminator machine learning model to differentiate between the reconstructed speech signal 310 and the reference speech signal 302.

In some implementations, a duration predictor 316 may process the text feature embedding 312 to generate a predicted spoken duration for the reference text data 303. The predicted spoken duration may be used to modify the text feature embedding 312 to reflect the predicted duration of each element of the reference text data 303. Where the text feature embedding 312 is used in the method 300, the duration modified text feature embedding 312 may be used, for example, by the embedding converter 313 to generate the one or more embedding conversions 314. The loss function may comprise a duration prediction term based upon the predicted spoken duration and a reference spoken duration. The reference spoken duration may be provided as part of the training example 301 or may be determined from the reference speech signal 302.

In some implementations, where a text feature embedding 312 generated from the reference text data 303 is converted to a speech feature embedding using the embedding converter 313, the speech decoder 309 may also process the text converted speech feature embedding to generate a second speech signal. This mimics the text-to-speech generation process and the loss function may further comprise a generative loss term based upon the second speech signal and the reference speech signal 302. For example, the generative loss term may be in the same form as the reconstruction loss term or adversarial training may be used for the generative loss term or any other appropriate measure of difference may be used.

It will be appreciated that whilst the loss function may comprise a plurality of terms and only a subset of components may be updated based upon particular terms of the loss function, the components of the system are jointly trained and updated together as a one-stage system.

It will be further appreciated that even with the inclusion of prosody control via the prosody encoder and the speech decoder, the system can still be trained using existing training frameworks such as a variational auto-encoder framework without necessarily requiring any prosody specific modification of the loss functions used in the framework.

FIG. 4 is a flow diagram illustrating an example method 400 of generating expressive speech audio. FIG. 4 displays a general overview of the methods described in relation to FIG. 2.

In step 4.1, user-input text data is received. The received text data is indicative of the desired content of the speech audio to be generated. For example, the text data may comprise data indicative of words to be spoken and/or any paralinguistic utterances such as sighs, yawns, moans, laughs, grunts, etc. The text data may be encoded by a sequence of vectors with each vector representing a word, character, phoneme or any other sub-word unit or paralinguistic utterance.

In step 4.2, prosody data obtained from user-input speech style data is received. The prosody data may comprise prosodic statistical features. For example, the prosody data may comprise one or more statistical features of a pitch contour and/or a volume contour for the generated speech signal.

In step 4.3, the user-input text data is processed by a text encoder to generate a text feature embedding. The text feature embedding may comprise one or more vectors in a learned embedding space. Optionally, the text feature embedding may be processed by a duration predictor to generate a predicted spoken duration for the user-specified text data. The text feature embedding may be modified based upon the predicted spoken duration.

In step 4.4, a speech feature embedding is generated by an embedding converter based upon the text feature embedding. The embedding converter is trained with the aim of generating a speech feature embedding that would have been generated by a speech encoder from a speech signal corresponding to the user-input text data. The speech feature embedding may comprise one or more vectors in a learned embedding space.

In step 4.5, the prosody data is processed by a prosody encoder to generate a prosody feature embedding. The prosody feature embedding is a representation or encoding of the prosody data in a learned prosody embedding space. The prosody feature embedding may comprise one or more vectors in the learned embedding space.

In step 4.6, a speech signal is generated based upon the speech feature embedding and the prosody feature embedding. This may comprise combining the speech feature embedding and the prosody embedding, and processing, by the speech decoder, the combined embedding to generate the speech signal. The processing by the speech decoder generates a speech signal having the desired content according to the user-input text data with the desired speaking style according to the prosody data. In other words, the speech decoder decodes the speech feature embedding and prosody feature embedding to generate a corresponding expressive speech signal. The speech signal may be a waveform encoded in any suitable digital audio format.

In some implementations, the method can also comprise steps 4.7-4.9. In step 4.7, second prosody data is received. The second prosody data is indicative of a different speaking style compared to the prosody data received at step 4.2.

In step 4.8, the second prosody data is processed by the prosody encoder to generate a second prosody feature embedding.

In step 4.9, a modified speech signal is generated by the speech decoder based upon the speech feature embedding and the second prosody feature embedding. Thus, the modified speech signal has the same linguistic/para-linguistic content as the speech signal generated in step 4.6 but spoken in a different manner as specified by the second prosody data.

In some implementations of the method 400, the text encoder, embedding converter, prosody encoder and speech decoder comprise machine-learning models that are jointly trained. The machine-learning models may be based upon a variational auto-encoder framework. The machine-learning models may each comprise one or more neural network layers.

FIG. 5 is a flow diagram illustrating an example method 500 of training a speech audio generation system. FIG. 5 displays a general overview of the methods described in relation to FIG. 3.

In step 5.1, one or more training examples are received. Each training example comprises: (i) a reference speech signal and (ii) reference text data corresponding to the reference speech signal.

Step 5.2 comprises steps 5.2.1 to 5.2.8 that are performed for each of the training examples.

In step 5.2.1, prosody data corresponding to the reference speech signal is received. In some implementations, the reference speech signal is processed by a prosody analyzer to generate the prosody data from the reference speech signal. The prosody data may comprise prosodic statistical features. For example, the prosody data may comprise one or more statistical features of a pitch contour and/or a volume contour for the generated speech signal.

In step 5.2.2, the reference speech signal is processed by a speech encoder to generate a speech feature embedding. The speech feature embedding may comprise one or more vectors in an embedding space.

In step 5.2.3, the reference text data is processed to generate a text feature embedding. Optionally, the text feature embedding may be processed by a duration predictor to generate a predicted spoken duration for the reference text data. The text feature embedding may be modified based upon the predicted spoken duration.

In step 5.2.4, one or more embedding conversions are generated by an embedding converter. The generation comprises, processing, by the embedding converter, the speech feature embedding to generate a speech converted text feature embedding; and/or processing, by the embedding converter, the text feature embedding to generate a text converted speech feature embedding. The one or more embedding conversions comprises the speech converted text feature embedding and/or the text converted speech feature embedding.

In step 5.2.5, the prosody data is processed by the prosody encoder to generate a prosody feature embedding. The prosody feature embedding may comprise one or more vectors in an embedding space.

In step 5.2.6, a reconstructed speech signal is generated by the speech decoder based upon the speech feature embedding and the prosody feature embedding. That is, the speech decoder attempts to reconstruct the reference speech signal from the speech feature embedding and the prosody feature embedding.

In step 5.2.7, a loss value is determined using a loss function based upon the reconstructed speech signal, the reference speech signal and the one or more embedding conversions. The loss function may comprise one or more terms. In some implementations, the loss function comprises a reconstruction loss term based upon a measure of difference between the reconstructed speech signal and the reference speech signal. In some implementations, the loss function comprises a conversion loss term based upon a KL-divergence computed using the one or more embedding conversions. In some implementations, the loss function comprises an adversarial loss term based upon an ability of a discriminator machine-learning model to differentiate between the reconstructed speech signal and the reference speech signal. The loss function may be based upon an evidence-based lower bound (ELBO), for example, where the training follows a variational auto-encoder framework.

In step 5.2.8, one or more of the following are updated: the speech decoder, the prosody encoder, the speech encoder, the embedding converter, the speech encoder, or the text encoder based upon the determined loss value. This may comprise using a gradient-based optimization technique.

FIG. 6 shows a schematic example of a system/apparatus 600 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method of training a machine-learned expressive speech audio generation system for use in a video game, the method comprising:

receiving one or more training examples, each training example comprising: (i) a reference speech signal and (ii) reference text data corresponding to the reference speech signal;

for each of the one or more training examples:

receiving prosody data corresponding to the reference speech signal;

processing, by a speech encoder, the reference speech signal to generate a speech feature embedding;

processing, by a text encoder, the reference text data to generate a text feature embedding;

generating, by an embedding converter, one or more embedding conversions, wherein generating comprises:

processing, by the embedding converter, the speech feature embedding to generate a speech converted text feature embedding; and/or processing, by the embedding converter, the text feature embedding to generate a text converted speech feature embedding;

the one or more embedding conversions comprising the speech converted text feature embedding and/or the text converted speech feature embedding;

processing, by a prosody encoder, the prosody data to generate a prosody feature embedding;

generating, by a speech decoder, a reconstructed speech signal based upon the speech feature embedding and the prosody feature embedding;

determining a loss value using a loss function based upon the reconstructed speech signal, the reference speech signal and the one or more embedding conversions, wherein the loss function comprises a conversion loss term based upon an error measure of the generated one or more embedding conversions; and updating one or more of the following: the speech decoder, the prosody encoder, the speech encoder, the embedding converter, the speech encoder, or the text encoder based upon the determined loss value.

2. The method of claim 1, wherein the loss function comprises a reconstruction loss term based upon a measure of difference between the reconstructed speech signal and the reference speech signal.

3. The method of claim 1, wherein the error measure is based upon a KL-divergence.

4. The method of claim 1, wherein the loss function comprises an adversarial loss term based upon an ability of a discriminator machine-learning model to differentiate between the reconstructed speech signal and the reference speech signal.

5. The method of claim 1, further comprising:

generating, by a prosody analyzer, the prosody data from the reference speech signal.

6. The method of claim 1, wherein the prosody data comprises prosodic statistical features.

7. The method of claim 6, wherein the prosody data comprises one or more statistical features of a pitch contour and/or a volume contour for the reference speech signal.

8. The method of claim 1, wherein the updating based upon the determined loss value comprises using a gradient-based optimization technique.

9. The method of claim 1, wherein the loss function is based upon an evidence-based lower bound (ELBO).

10. The method of claim 1, further comprising:

processing, by a duration predictor, the text feature embedding to generate a predicted spoken duration for the reference text data; and modifying the text feature embedding based upon the predicted spoken duration.

11. A computing system for training a machine-learned expressive speech audio generation system for use in a video game, wherein the system is configured to:

receive one or more training examples, each training example comprising: (i) a reference speech signal and (ii) reference text data corresponding to the reference speech signal;

for each of the one or more training examples:

receive prosody data corresponding to the reference speech signal;

process, by a speech encoder, the reference speech signal to generate a speech feature embedding;

process, by a text encoder, the reference text data to generate a text feature embedding;

generate, by an embedding converter, one or more embedding conversions, wherein, in generating, the system is configured to:

process, by the embedding converter, the speech feature embedding to generate a speech converted text feature embedding; and/or process, by the embedding converter, the text feature embedding to generate a text converted speech feature embedding;

the one or more embedding conversions comprising the speech converted text feature embedding and/or the text converted speech feature embedding;

process, by a prosody encoder, the prosody data to generate a prosody feature embedding;

generate, by a speech decoder, a reconstructed speech signal based upon the speech feature embedding and the prosody feature embedding;

determine a loss value using a loss function based upon the reconstructed speech signal, the reference speech signal and the one or more embedding conversions, wherein the loss function comprises a conversion loss term based upon an error measure of the generated one or more embedding conversions; and update one or more of the following: the speech decoder, the prosody encoder, the speech encoder, the embedding converter, the speech encoder, or the text encoder based upon the determined loss value.

12. The system of claim 11, wherein the loss function comprises a reconstruction loss term based upon a measure of difference between the reconstructed speech signal and the reference speech signal.

13. The system of claim 11, wherein the error measure is based upon a KL-divergence.

14. The system of claim 11, wherein the loss function comprises an adversarial loss term based upon an ability of a discriminator machine-learning model to differentiate between the reconstructed speech signal and the reference speech signal.

15. The system of claim 11, wherein the system is further configured to:

generate, by a prosody analyzer, the prosody data from the reference speech signal.

16. The system of claim 11, wherein the prosody data comprises prosodic statistical features.

17. The system of claim 11, wherein the prosody data comprises one or more statistical features of a pitch contour and/or a volume contour for the reference speech signal.

18. The system of claim 11, wherein the updating based upon the determined loss value comprises using a gradient-based optimization technique.

19. The system of claim 11, wherein the loss function is based upon an evidence-based lower bound (ELBO).

20. One or more non-transitory computer-readable storage media comprising instructions which, when executed by one or more processors, cause the one or more processors to carry out a method comprising:

receiving one or more training examples, each training example comprising: (i) a reference speech signal and (ii) reference text data corresponding to the reference speech signal;

for each of the one or more training examples:

receiving prosody data corresponding to the reference speech signal;

processing, by a speech encoder, the reference speech signal to generate a speech feature embedding;

processing, by a text encoder, the reference text data to generate a text feature embedding;

generating, by an embedding converter, one or more embedding conversions, wherein generating comprises:

processing, by the embedding converter, the speech feature embedding to generate a speech converted text feature embedding; and/or processing, by the embedding converter, the text feature embedding to generate a text converted speech feature embedding;

the one or more embedding conversions comprising the speech converted text feature embedding and/or the text converted speech feature embedding;

processing, by a prosody encoder, the prosody data to generate a prosody feature embedding;

generating, by a speech decoder, a reconstructed speech signal based upon the speech feature embedding and the prosody feature embedding;

determining a loss value using a loss function based upon the reconstructed speech signal, the reference speech signal and the one or more embedding conversions, wherein the loss function comprises a conversion loss term based upon an error measure of the generated one or more embedding conversions; and updating one or more of the following: the speech decoder, the prosody encoder, the speech encoder, the embedding converter, the speech encoder, or the text encoder based upon the determined loss value.

* * * * *